United States Patent
Fujiwara

(10) Patent No.: US 12,231,055 B2
(45) Date of Patent: Feb. 18, 2025

(54) SEMICONDUCTOR MODULE AND POWER CONVERTER

(71) Applicant: Mitsubishi Electric Corporation, Tokyo (JP)

(72) Inventor: Tetsuro Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 228 days.

(21) Appl. No.: 18/095,213

(22) Filed: Jan. 10, 2023

(65) Prior Publication Data

US 2023/0261585 A1 Aug. 17, 2023

(30) Foreign Application Priority Data

Feb. 15, 2022 (JP) ................................. 2022-020937

(51) Int. Cl.
*H02M 7/53* (2006.01)
*H02M 7/00* (2006.01)
*H02M 7/5387* (2007.01)

(52) U.S. Cl.
CPC ......... *H02M 7/003* (2013.01); *H02M 7/5387* (2013.01)

(58) Field of Classification Search
CPC ....... H02M 7/003; H02M 7/53; H02M 7/5387
See application file for complete search history.

(56) References Cited

U.S. PATENT DOCUMENTS

| | | | | |
|---|---|---|---|---|
| 5,517,063 A | * | 5/1996 | Schantz, Jr. | ............... B60L 3/00 363/71 |
| 2002/0034087 A1 | | 3/2002 | Suzuki et al. | |
| 2016/0105004 A1 | * | 4/2016 | Baeumel | ........... H01L 23/49562 361/624 |

FOREIGN PATENT DOCUMENTS

JP 3793407 A 7/2006

* cited by examiner

*Primary Examiner* — Gary L Laxton
(74) *Attorney, Agent, or Firm* — Sughrue Mion, PLLC

(57) ABSTRACT

By effectively reducing a wire inductance on each of busbars, surge voltage based on the wire inductance is reduced. A semiconductor module includes a switching circuit composed of a first semiconductor element and a second semiconductor element connected in series, a first busbar to which a positive electrode side of the first semiconductor element is connected, a second busbar to which a negative electrode side of the second semiconductor element is connected, and a third busbar to which a negative electrode side of the first semiconductor element and a positive electrode side of the second semiconductor element are connected. The first busbar, the second busbar, and the third busbar extend in a same direction. The second busbar is disposed such that the third busbar and the first busbar are interposed within the second busbar.

20 Claims, 14 Drawing Sheets

SEMICONDUCTOR MODULE AND POWER CONVERTER

BACKGROUND OF THE INVENTION

1. Field of the Invention

The present disclosure relates to a semiconductor module and a power converter provided therewith.

2. Description of the Background Art

As power converters, power converters having high power densities and low power losses have been required, and switching elements such as insulated gate bipolar transistor (IGBT) and metal-oxide-semiconductor field-effect transistor (MOSFET) for supplying power have been increasingly adapted to higher current, higher voltage, and higher switching speed. If the switching elements are increasingly adapted to higher current, higher voltage, and higher switching speed in this manner, surge voltage that occurs at the time of switching increases. Consequently, switching loss in the switching elements and heat generated from the switching elements increase. It is conceivable to provide a highly-heat-dissipating member in order to suppress heat generation. However, by using the highly-heat-dissipating member, cost increase or device upsizing is unavoidable.

The magnitude of surge voltage generated by switching of a switching element is dependent on the magnitude of a wire inductance on, for example, a busbar electrically connected to the switching element. If the wire inductance is large, the surge voltage becomes large. Valid means for reducing a wire inductance is to: shorten a busbar; or cause currents to flow in directions opposite to each other so as to be able to cancel out magnetic fluxes generated from a pair of busbars.

Conventionally, there has been a power converter including a semiconductor module in which a switching element in an upper arm and a switching element in a lower arm are connected in series. Busbars in the semiconductor module include: a positive-electrode input busbar to which a positive electrode side of the switching element in the upper arm is connected; a negative-electrode input busbar to which a negative electrode side of the switching element in the lower arm is connected; and an output busbar to which a negative electrode side of the switching element in the upper arm and a positive electrode side of the switching element in the lower arm are connected. The positive-electrode input busbar and the negative-electrode input busbar are disposed so as to be parallel to each other at the same height, and the output busbar is disposed so as to be orthogonal to the positive-electrode input busbar and the negative-electrode input busbar. In addition, there has been a configuration in which the switching element in the upper arm and the switching element in the lower arm are connected to each other by the output busbar so that: the module is formed to be compact without using any wire extending in a direction perpendicular to the positive-electrode input busbar and the negative-electrode input busbar; and increase in wire inductance is suppressed. Further, currents flow in directions opposite to each other through the positive-electrode input busbar and the negative-electrode input busbar disposed so as to be parallel to each other. Consequently, generated magnetic fluxes are canceled out, whereby inductances are reduced (see Patent Document 1).

Patent Document 1: Japanese Patent No. 3793407

In the power converter of the above Patent Document 1, the busbars as wires are made so as to become as compact as possible, and the pair of busbars, i.e., the positive-electrode input busbar and the negative-electrode input busbar, are disposed so as to be parallel to each other, whereby the inductances are reduced. However, a portion for fastening to a module case is provided at an output busbar portion disposed between the pair of busbars, i.e., the positive-electrode input busbar and the negative-electrode input busbar, so as to be orthogonal to the pair of busbars. Thus, the output busbar is lengthened, and it is necessary that the distance between the positive-electrode input busbar and the negative-electrode input busbar is long. Therefore, the inductances cannot be sufficiently reduced by the effect of canceling out magnetic fluxes from the pair of busbars alone. Further, through the output busbar, current flows in a direction orthogonal to the positive-electrode input busbar and the negative-electrode input busbar. Thus, magnetic fluxes generated from the output busbar and the positive-electrode input busbar do not cancel each other out, and magnetic fluxes generated from the output busbar and the negative-electrode input busbar do not cancel each other out. Therefore, a wire inductance on the output busbar cannot be reduced, whereby reduction in inductance cannot be achieved in the entire semiconductor module.

SUMMARY OF THE INVENTION

The present disclosure has been made to solve the above problems, and an object of the present disclosure is to provide a semiconductor module and a power converter in which a wire inductance in each of busbars can be effectively reduced.

A semiconductor module according to the present disclosure includes:
  a switching circuit composed of a first semiconductor element and a second semiconductor element connected in series;
  a first busbar connected to a positive electrode side of the first semiconductor element;
  a second busbar connected to a negative electrode side of the second semiconductor element; and
  a third busbar connected to a negative electrode side of the first semiconductor element and a positive electrode side of the second semiconductor element, wherein
  the first busbar, the second busbar, and the third busbar extend in a same direction, and
  one busbar out of the first busbar and the second busbar is disposed such that the third busbar and another busbar out of the first busbar and the second busbar are interposed within the one busbar.

A power converter according to the present disclosure includes:
  the semiconductor module; and
  a smoothing capacitor configured to smooth DC voltage to be applied to the semiconductor module, wherein
  the first busbar has a first terminal portion configured so as to be connected to a positive-electrode-side wire of the smoothing capacitor,
  the second busbar has a second terminal portion configured so as to be connected to a negative-electrode-side wire of the smoothing capacitor, and
  the first terminal portion and the second terminal portion protrude in a same direction.

In the semiconductor module and the power converter according to the present disclosure, a wire inductance on each of the busbars can be effectively reduced.

DETAILED DESCRIPTION OF THE PREFERRED EMBODIMENTS OF THE INVENTION

First Embodiment

The present embodiment relates to a semiconductor module including busbars, and a power converter including the semiconductor module.

Figure 1:
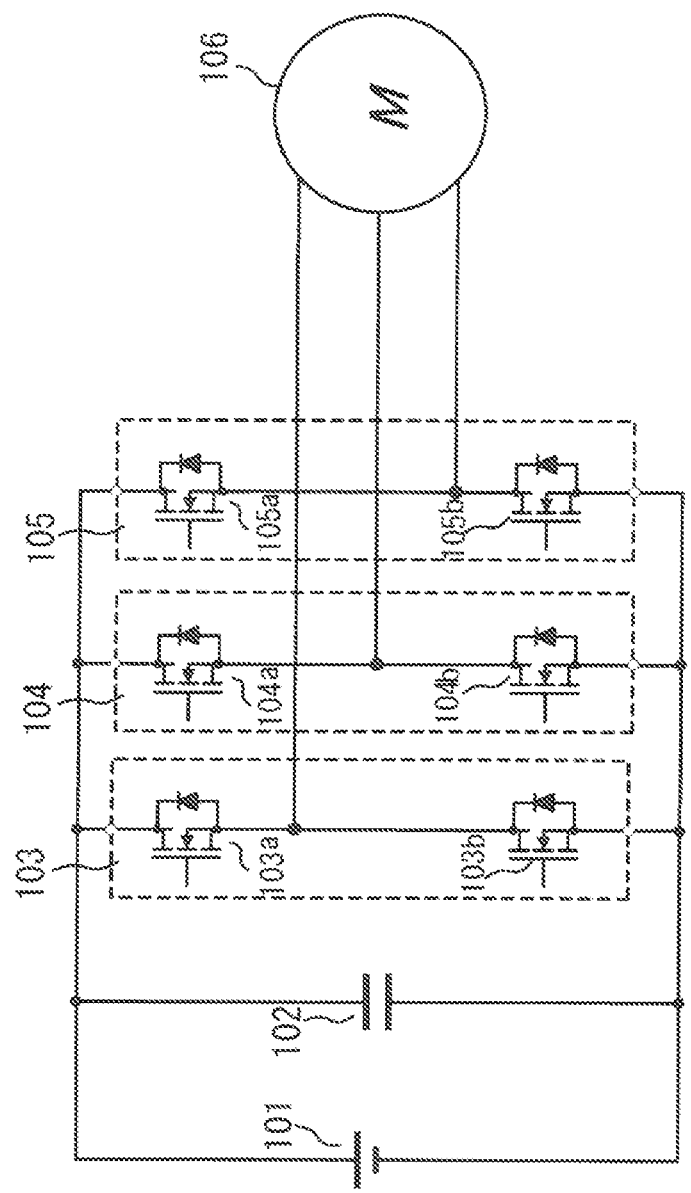
FIG. 1 is a circuit diagram showing a power converter including a semiconductor module according to a first embodiment.

FIG. 1 is a circuit diagram showing the power converter including the semiconductor module according to the first embodiment, and is a configuration diagram showing a three-phase inverter circuit for driving a three-phase AC motor. The power converter according to the present embodiment includes a DC power supply 101 and a three-phase AC motor 106. The DC power supply 101 is connected to a smoothing capacitor 102 for smoothing DC voltage to be applied to the semiconductor module. The three-phase inverter circuit composed of a U phase arm 103 in which switching elements 103a and 103b are connected in series, a V phase arm 104 in which switching elements 104a and 104b are connected in series, and a W phase arm 105 in which switching elements 105a and 105b are connected in series, is connected at a stage subsequent to the smoothing capacitor 102. The three-phase AC motor 106 is connected at a stage subsequent to the three-phase inverter circuit. The switching elements 103a to 105b in the arms 103 to 105 for the respective phases are controlled to be turned on/off in a predetermined order, whereby three-phase AC current is generated to drive the three-phase AC motor 106.

Each of the switching elements 103a to 105b is formed by, for example, a metal-oxide-semiconductor field-effect transistor (MOSFET). Alternatively, as each of the switching elements 103a to 105b, a self-arc-extinguishing semiconductor switching element such as an insulated gate bipolar transistor (IGBT) to which a diode is connected in antiparallel may be used, and a wide-bandgap semiconductor made from silicon carbide (SiC), gallium nitride (GaN), or the like may be used. In the present embodiment, a case in which an MOSFET is used as each of the switching elements 103a to 105b will be described.

The U phase arm 103, the V phase arm 104, and the W phase arm 105 are configured by, for example, semiconductor modules each having a 2-in-1 structure in which the switching elements in upper and lower arms and the busbars are integrated with one another by resin-molding. Alternatively, the U phase arm 103, the V phase arm 104, and the W phase arm 105 may be configured by a semiconductor module having a 6-in-1 structure in which all of the switching elements in the upper and lower arms for the three phases are integrated with one another by resin-molding. In the present embodiment, a case in which each semiconductor module having the 2-in-1 structure is used will be described.

Figure 2:
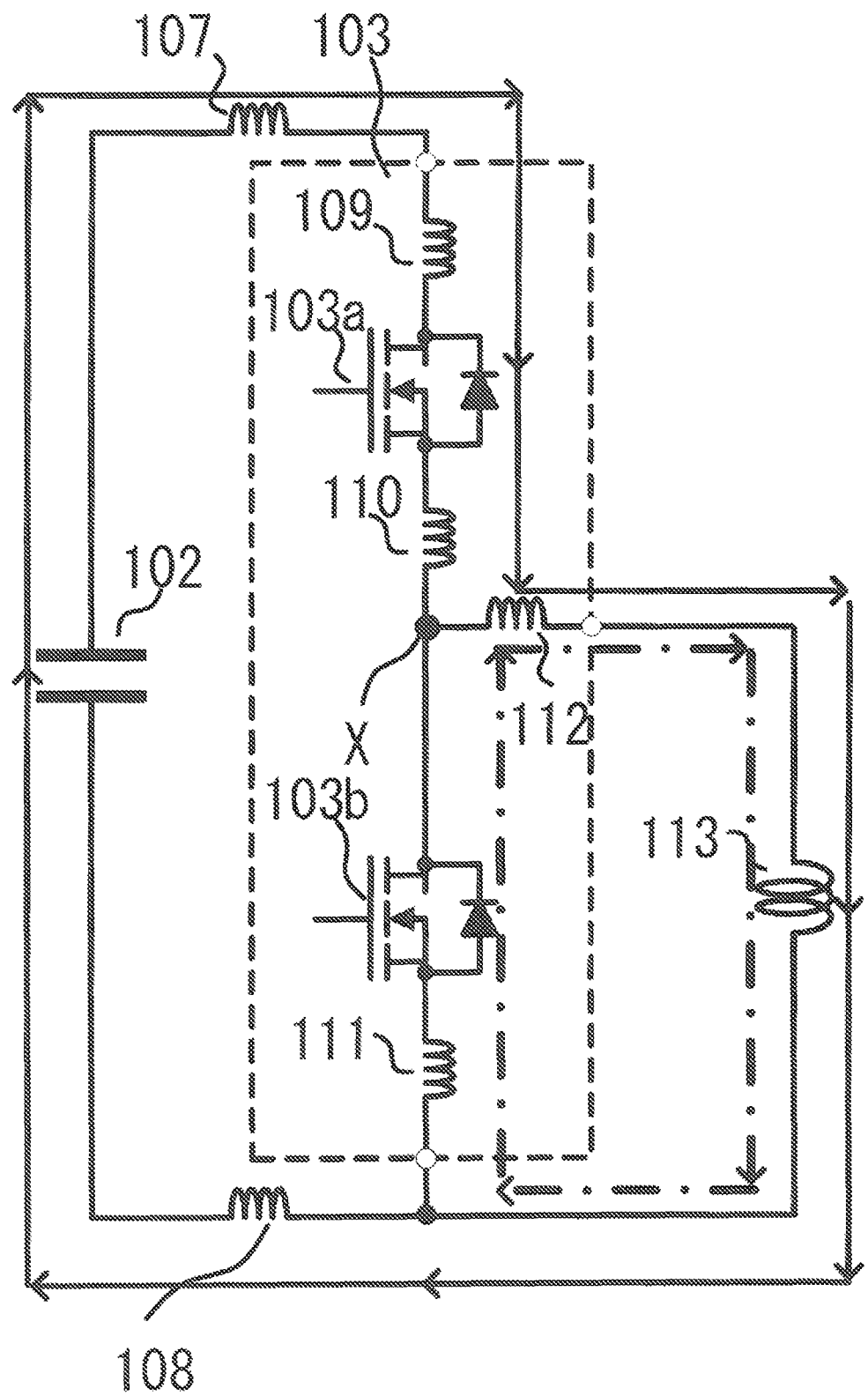
FIG. 2 is a circuit diagram showing a switching operation in a U phase arm of a three-phase inverter circuit.

Next, the relationship between wire inductance and surge voltage will be described. FIG. 2 is a circuit diagram showing, for simplification, a switching operation in the U phase arm 103 of the three-phase inverter circuit in FIG. 1, and shows a circuit in which the three-phase AC motor 106 is substituted with an inductance load 113. The principle of generation of surge voltage is the same as that in the three-phase inverter circuit in FIG. 1 and will be described with reference to FIG. 2. It is noted that, in FIG. 2, a wire inductance on a positive electrode side of the smoothing capacitor 102 is denoted by 107, and a wire inductance on a negative electrode side of the smoothing capacitor 102 is denoted by 108.

A wire inductance on a drain side of the switching element (first semiconductor element) 103a is denoted by 109, a wire inductance on a source side (a drain side of the switching element 103b) of the switching element 103a is denoted by 110, a wire inductance on a source side of the switching element 103b (second semiconductor element) is denoted by ill, and a wire inductance between the load inductance 113 and a connection point X between the switching element 103a and the switching element 103b is denoted by 112. Specifically, the wire inductances 109 to 112 are wire inductances caused by busbars in the semiconductor module.

An OFF surge voltage ΔVs applied when the state of the switching element 103a is changed from an ON state to an OFF state, will be described. In FIG. 2, a current path indicated by solid-line arrows is formed when the switching element 103a is turned ON, and a current path indicated by alternate-long-and-short-dash-line arrows is formed when the switching element 103a is turned OFF. Since switching between the current paths is performed when the state of the switching element 103a is changed from an ON state to an OFF state, current flowing through the wires changes at a slope of di/dt. Here, if the magnitude of the wire inductance 107 is defined as $L_{107}$, the magnitude of the wire inductance 108 is defined as $L_{109}$, the magnitude of the wire inductance 109 is defined as $L_{110}$, the magnitude of the wire inductance 110 is defined as $L_{111}$, and the magnitude of the wire inductance 111 is defined as Lu, the OFF surge voltage ΔVs can be expressed by the following expression (1).

$$\Delta Vs=(L_{107}+L_{108}+L_{109}+L_{110}+L_{111})\times di/dt \quad (1)$$

As expressed by expression (1), the OFF surge voltage ΔVs is proportional to the sum of the wire inductances $L_{107}$, $L_{108}$, $L_{109}$, $L_{110}$, and $L_{111}$. Therefore, if these wire inductance components can be reduced, the surge voltage can be reduced.

Figure 3:
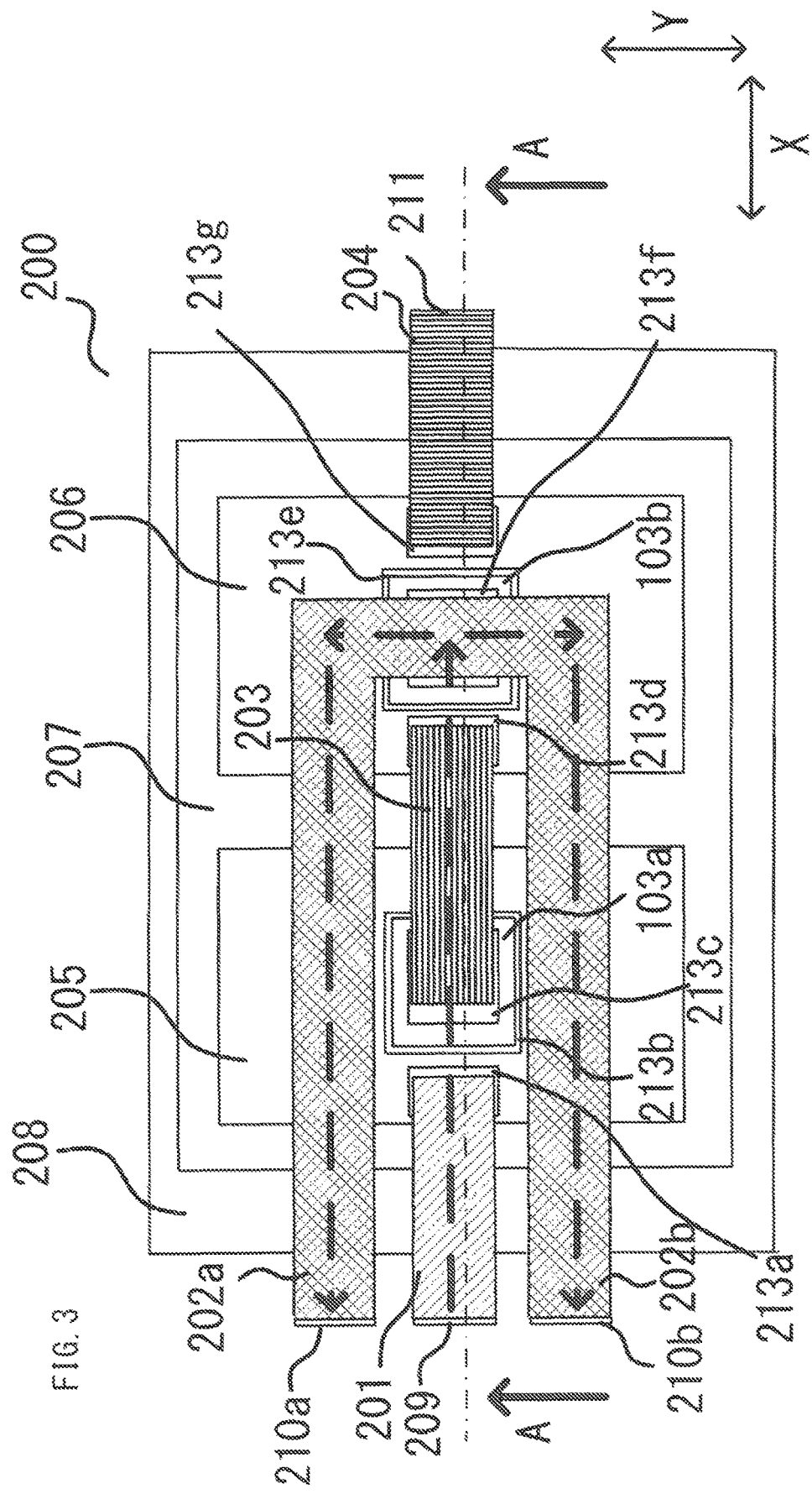
FIG. 3 is a cross-sectional plane view showing the semiconductor module according to the first embodiment.
Figure 4:
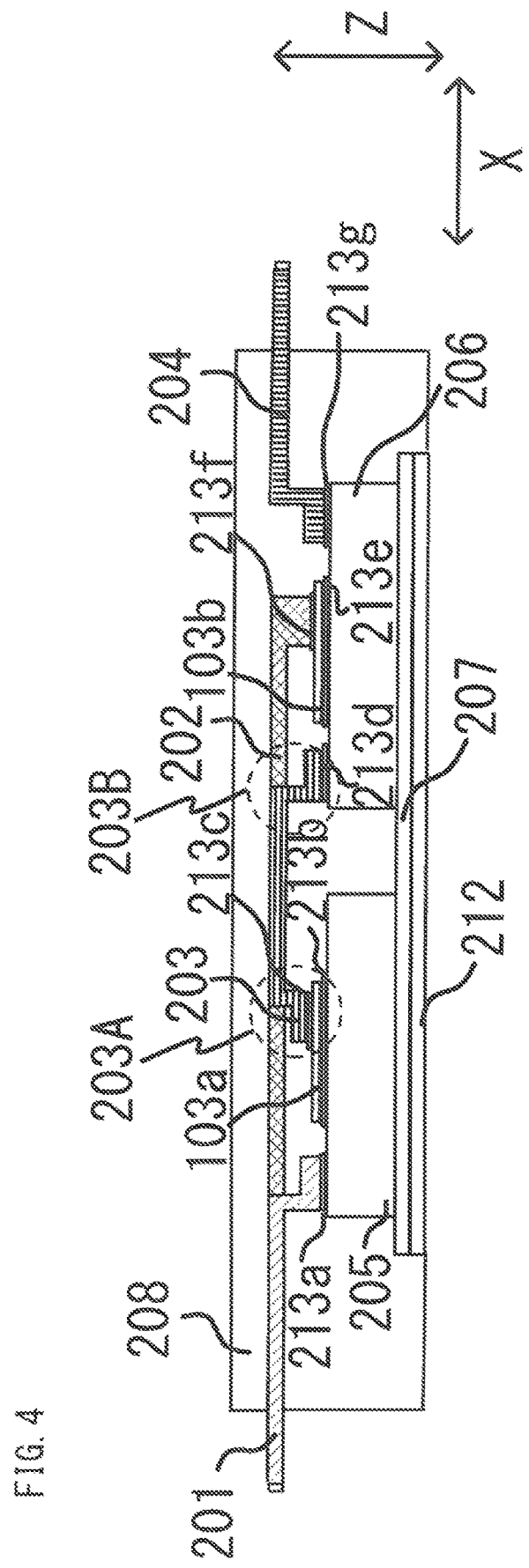
FIG. 4 is a cross-sectional view taken along a line A-A in FIG. 3.

FIG. 3 is a cross-sectional plane view showing the semiconductor module according to the first embodiment, and FIG. 4 is a cross-sectional view taken along a line A-A in FIG. 3. In FIG. 3 and FIG. 4, the height direction of the semiconductor module is defined as a Z direction, and directions perpendicular to the Z direction are defined as an X direction and a Y direction. That is, the X direction and the Y direction are the horizontal directions of the semiconductor module. FIG. 3 is a plane view spreading in the X direction and the Y direction, and FIG. 4 is a cross-sectional view spreading in the X direction and the Z direction. In the drawings, the switching elements 103a and 103b, a P busbar 201, an N busbar 202a, an N busbar 202b, an AC busbar 203, and a load busbar 204 are molded by resin to form a semiconductor module (first semiconductor module) 200. A mold resin 208 is made from an insulation resin material such as epoxy resin and is molded by, after disposing the constituent components to be molded by resin inside a mold, injecting the resin into the mold so as to seal the constituent components.

In FIG. 3 and FIG. 4, a busbar to which a positive electrode side of the switching element 103a in the upper arm is connected is defined as the P busbar (first busbar) 201, busbars to which a negative electrode side of the switching element 103b in the lower arm is connected are defined as the N busbars (second busbars) 202a and 202b, and a busbar to which a negative electrode side of the switching element 103a in the upper arm and a positive electrode side of the switching element 103b in the lower arm are connected is defined as the AC busbar (third busbar) 203. Inside the mold resin 208, the P busbar 201 and a heat dissipation plate 205 are connected to each other via a joining member 213a, the heat dissipation plate 205 and a drain terminal of the switching element 103a are connected to each other via a joining member 213b, a source terminal of the switching element 103a and the AC busbar 203 are connected to each other via a joining member 213c, the AC busbar 203 and a heat dissipation plate 206 are connected to each other via a joining member 213d, the heat dissipation plate 206 and a drain terminal of the switching element 103b are connected to each other via a joining member 213e, a source terminal of the switching element 103b and the N busbar 202 are connected to each other via a joining member 213f, and the heat dissipation plate 206 and the load busbar 204 are connected to each other via a joining member 213g. Each of the heat dissipation plates 205 and 206 is made of a metal conductor such as copper, the heat dissipation plate 205 has the same potential as that of the drain terminal of the switching element 103a, and the heat dissipation plate 206 has the same potential as that of the drain terminal of the switching element 103b. Each of the joining members 213a to 213g is made of solder or the like. Each of the heat dissipation plates 205 and 206 is connected to a metal plate 212 made of copper or the like by an insulation sheet 207 interposed therebetween, and is insulated from the outside of the module.

Here, a wire inductance caused by the P busbar 201 corresponds to the wire inductance 109 in FIG. 2, a wire inductance caused by the N busbar 202 corresponds to the wire inductance 111 in FIG. 2, a wire inductance caused by the AC busbar 203 corresponds to the wire inductance 110 in FIG. 2, and a wire inductance caused by the load busbar 204 corresponds to the wire inductance 112 in FIG. 2. A connection terminal between the P busbar 201 and a positive-electrode-side wire of the smoothing capacitor 102 is denoted by 209, connection terminals between a negative-electrode-side wire of the smoothing capacitor 102 and the respective N busbars 202a and 202b are denoted by 210a and 210b, and a connection terminal between the load busbar 204 and the load wire is denoted by 211. It is noted that control circuit wires such as gate wires of the switching elements 103a and 103b are not shown.

In FIG. 3, the N busbars 202a and 202b are disposed such that the P busbar 201 and the AC busbar 203 are interposed therebetween. Specific descriptions are as follows. In the semiconductor module 200, the P busbar 201 and the AC busbar 203 are disposed between the N busbars 202a and 202b (having planar cross sections forming a U shape) which are disposed so as to be branched into two parts, in the direction (X direction) in which the positive-electrode-side connection terminal 209 of the P busbar 201 and the negative-electrode-side connection terminals 210a and 210b of the N busbars 202a and 202b protrude. It is noted that, in an X-Y plane defined by the X direction and the Y direction orthogonal thereto, the P busbar 201, the N busbars 202a and 202b, and the AC busbar 203 are disposed such that at least one part of surfaces thereof is substantially flush with one another and parallel to one another. Specifically, as shown in FIG. 4, even though step portions 203A and 203B are present at, for example, parts of the AC busbar 203, the surfaces of the P busbar 201, the N busbars 202a and 202b, and the other parts of the AC busbar 203 are substantially flush with one another and parallel to one another.

Figure 5:
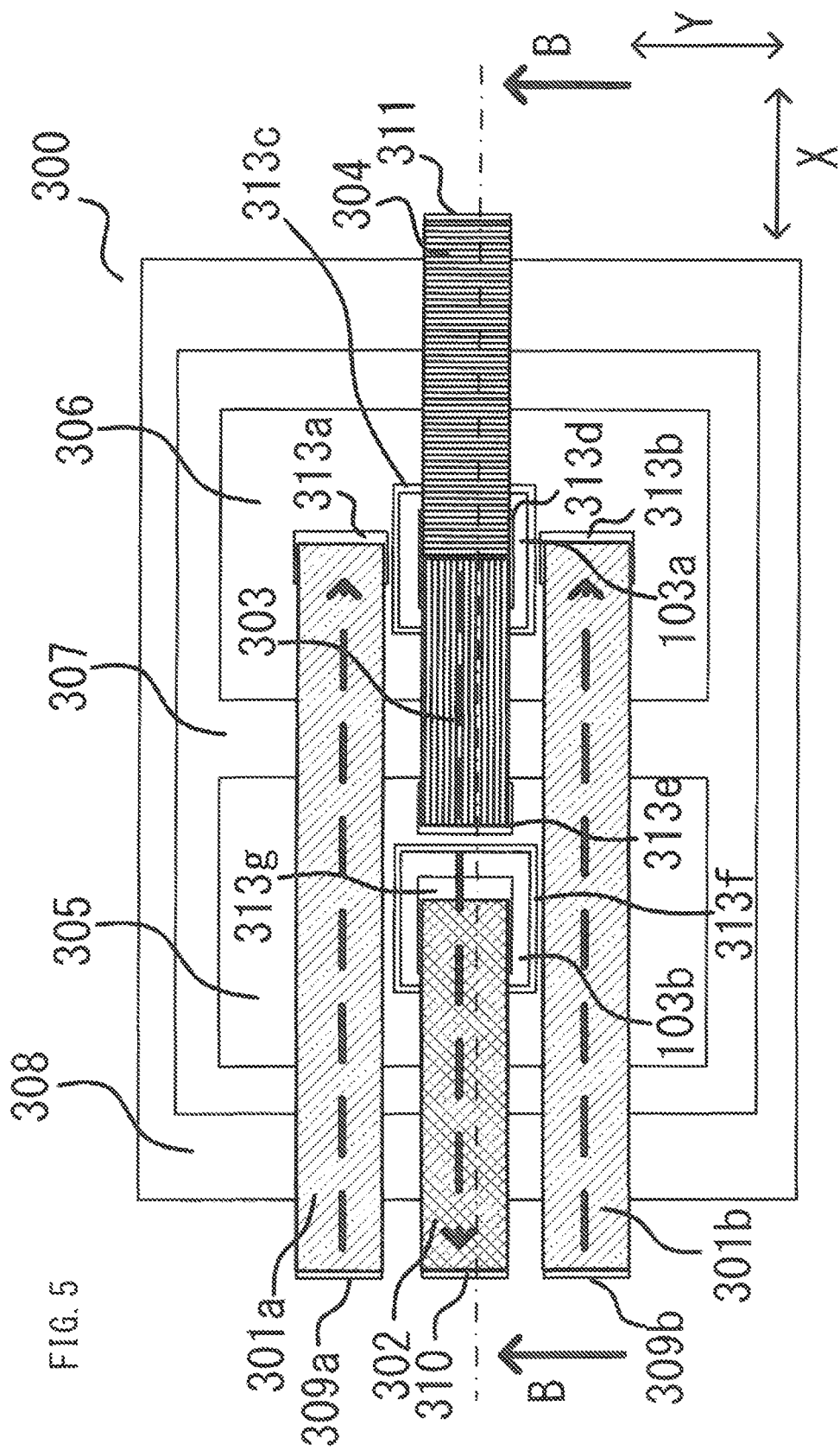
FIG. 5 is a cross-sectional plane view showing another semiconductor module according to the first embodiment.
Figure 6:
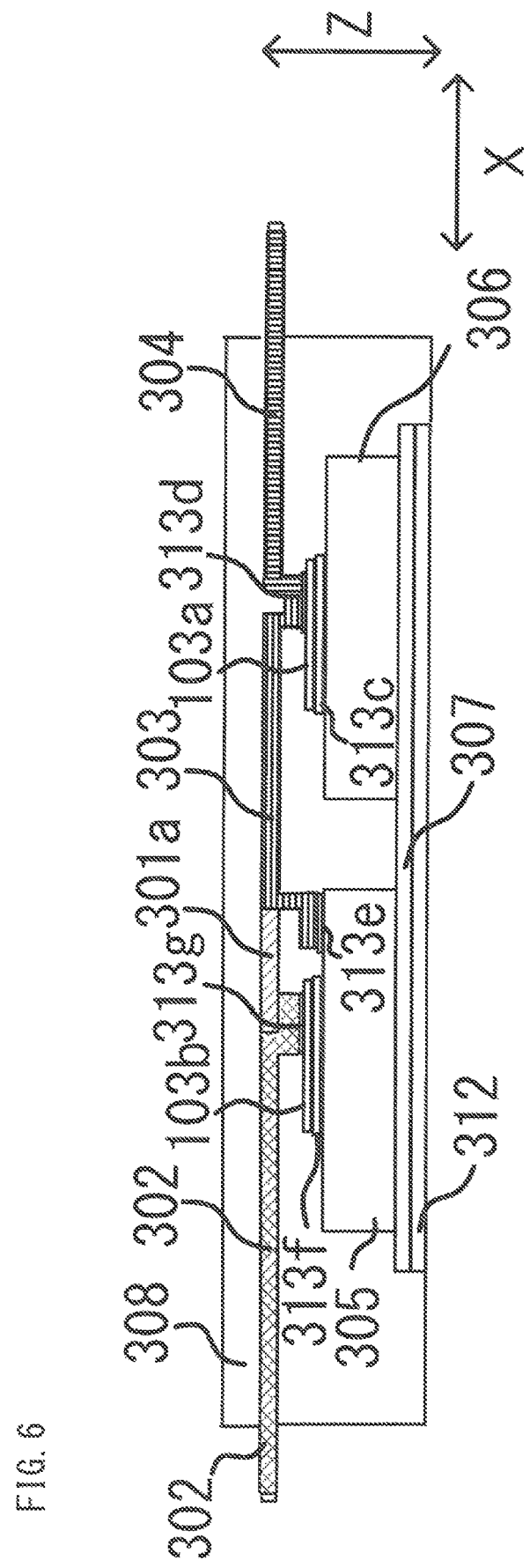
FIG. 6 is a cross-sectional view taken along a line B-B in FIG. 5.

Next, the effect of enabling reduction in the wire inductances 109, 110, and 111 caused by the P busbar 201, the N busbars 202a and 202b, and the AC busbar 203 achieved by the configuration of the semiconductor module 200 shown in FIG. 3, will be described. Current paths generated when surge voltage is generated are indicated by dotted line arrows in FIG. 3. The direction of current flowing through the P busbar 201 and the AC busbar 203 interposed between the N busbars 202a and 202b is opposite to the directions of currents flowing through the N busbars 202a and 202b. That is, the N busbars 202a and 202b through which current flows in a direction opposite to the direction of current flowing through the P busbar 201 and the AC busbar 203, are disposed on both sides adjacent to the P busbar 201 and the AC busbar 203. Consequently, a magnetic flux generated from each of the P busbar 201 and the AC busbar 203 and a magnetic flux generated from each of the N busbars 202a and 202b can be effectively canceled out. Therefore, the wire inductances 109, 110, and 111 caused by the P busbar 201, the N busbars 202a and 202b, and the AC busbar 203 can be reduced. Further the P busbar 201, the N busbars 202a and 202b, and the AC busbar 203 are disposed so as to be flush with one another (on an X-Y plane). Thus the distance between the P busbar 201 and each of the N busbars 202a and 202b and the distance between the AC busbar 203 and each of the N busbars 202a and 202b can be set to be shorter than the case in which the P busbar 201, the N busbars 202a and 202b, and the AC busbar 203 are disposed so as not to be flush with one another. Therefore the magnetic flux cancellation effect can become higher FIG. 5 is a cross-sectional plane view showing another semiconductor module according to the first embodiment, and FIG. 6 is a cross-sectional view taken along a line B-B in FIG. 5. Although the case in which the N busbars 202*a* and 202*b* are disposed such that the P busbar 201 and the AC busbar 203 are interposed therebetween has been described with reference to FIG. 3 and FIG. 4, a configuration may be used in which P busbars 301*a* and 301*b* are disposed such that an N busbar 302 and an AC busbar 303 are interposed therebetween as shown in FIG. 5.

In FIG. 5 and FIG. 6, the switching elements 103*a* and 103*b*, the P busbars 301*a* and 301*b*, the N busbar 302, and the AC busbar 303 are molded by resin. A mold resin 308 is made from an insulation resin material such as epoxy resin and is molded by, after disposing the constituent components to be molded by resin inside a mold, injecting the resin into the mold so as to seal the constituent components.

Inside the mold resin 308, the P busbar 301*a* and a heat dissipation plate 306 are connected to each other via a joining member 313*a*, the P busbar 301*b* and the heat dissipation plate 306 are connected to each other via a joining member 313*b*, the heat dissipation plate 306 and the drain terminal of the switching element 103*a* are connected to each other via a joining member 313*c*, the source terminal of the switching element 103*a* and the AC busbar 303 are connected to each other via a joining member 313*d*, the AC busbar 303 and a heat dissipation plate 305 are connected to each other via a joining member 313*e*, the heat dissipation plate 305 and the drain terminal of the switching element 103*b* are connected to each other via a joining member 313*f*, the source terminal of the switching element 103*b* and the N busbar 302 are connected to each other via a joining member 313*g*, and the source terminal of the switching element 103*a* and a load busbar 304 are connected to each other via the joining member 313*d*.

Each of the heat dissipation plates 305 and 306 is made of a metal conductor such as copper, the heat dissipation plate 306 has the same potential as that of the drain terminal of the switching element 103*a*, and the heat dissipation plate 305 has the same potential as that of the drain terminal of the switching element 103*b*. Each of the heat dissipation plates 305 and 306 is connected to a metal plate 312 made of copper or the like via an insulation sheet 307, and is insulated from the outside of the module.

Here, a wire inductance caused by each of the P busbars 301*a* and 301*b* corresponds to the wire inductance 109 in FIG. 2, a wire inductance caused by the N busbar 302 corresponds to the wire inductance 111 in FIG. 2, a wire inductance caused by the AC busbar 303 corresponds to the wire inductance 110 in FIG. 2, and a wire inductance caused by the load busbar 304 corresponds to the wire inductance 112 in FIG. 2.

Connection terminals between the positive-electrode-side wire of the smoothing capacitor 102 and the respective P busbars 301*a* and 301*b* are denoted by 309*a* and 309*b*, a connection terminal between the N busbar 302 and the negative-electrode-side wire of the smoothing capacitor 102 is denoted by 310, and a connection terminal between the load busbar 304 and the load wire is denoted by 311. It is noted that control circuit wires such as the gate wires of the switching elements 103*a* and 103*b* are not shown.

In FIG. 5 and FIG. 6, the P busbars 301*a* and 301*b* are disposed such that the N busbar 302 and the AC busbar 303 are interposed therebetween. Specific descriptions are as follows. In a semiconductor module (a second semiconductor module) 300, the N busbar 302 and the AC busbar 303 are disposed between the two P busbars 301*a* and 301*b*, in the direction (X direction) in which the terminals 309*a* and 309*b* of the P busbars 301*a* and 301*b* and the terminal 310 of the N busbar 302 protrude. It is noted that, in an X-Y plane defined by the X direction and the direction (Y direction) orthogonal to the x direction, the P busbars 301*a* and 301*b*, the N busbar 302, and the AC busbar 303 are disposed such that at least one part of surfaces thereof is substantially flush with one another and parallel to one another.

Next, the effect of reducing the wire inductances caused by the P busbars 301*a* and 301*b*, the N busbar 302, and the AC busbar 303 achieved by the configuration of the semiconductor module 300 shown in FIG. 5 and FIG. 6, will be described. Current paths generated when surge voltage is generated are indicated by dotted line arrows in FIG. 5. The direction of current flowing through the N busbar 302 and the AC busbar 303 interposed between the two P busbars 301*a* and 301*b* is opposite to the directions of currents flowing through the P busbars 301*a* and 301*b*. That is, the two P busbars 301*a* and 301*b* through which current flows in a direction opposite to the direction of current flowing through the N busbar 302 and the AC busbar 303, are disposed on both sides adjacent to the N busbar 302 and the AC busbar 303. Consequently, a magnetic flux generated from each of the P busbars 301*a* and 301*b* and a magnetic flux generated from each of the AC busbar 303 and the N busbar 302 can be effectively canceled out. Therefore, the wire inductances 109, 110, and 111 caused by the P busbars 301*a* and 301*b*, the N busbar 302, and the AC busbar 303 can be reduced. Further the P busbars 301*a* and 301*b*, the N busbar 302, and the AC busbar 303 are disposed so as to be flush with one another (on an X-Y plane). Thus the distance between the N busbar 302 and each of the P busbars 301*a* and 301*b* and the distance between the AC busbar 303 and each of the P busbars 301*a* and 301*b* can be set to be shorter than the case in which the P busbars 301*a* and 301*b*, the N busbar 302, and the AC busbar 303 are disposed so as not to be flush with one another. Therefore the magnetic flux cancellation effect can become higher.

In addition, in the semiconductor modules in which the switching elements in the upper and lower arms constitute a 2-in-1 structure as shown in FIG. 3 to FIG. 6, the length of each busbar for connecting the upper arm and the lower arm to each other can be set to be shorter and the wire inductance caused by the busbar can be set to be smaller than the case in which the upper and lower arms are formed as separate modules. That is, in FIG. 3 to FIG. 6, the first semiconductor element and the second semiconductor element are packaged in the same module.

In addition, as shown in FIG. 3 to FIG. 6, the connection terminal (first terminal portion) 209, 309 between the positive-electrode-side wire of the smoothing capacitor 102 and the P busbar of the semiconductor module 200, 300, and the connection terminal (second terminal portion) 210, 310 between the negative-electrode-side wire of the smoothing capacitor 102 and the N busbar of the semiconductor module 200, 300 are disposed in the same direction. Consequently, the wire inductance of the smoothing capacitor 102 can be reduced.

Figure 7:
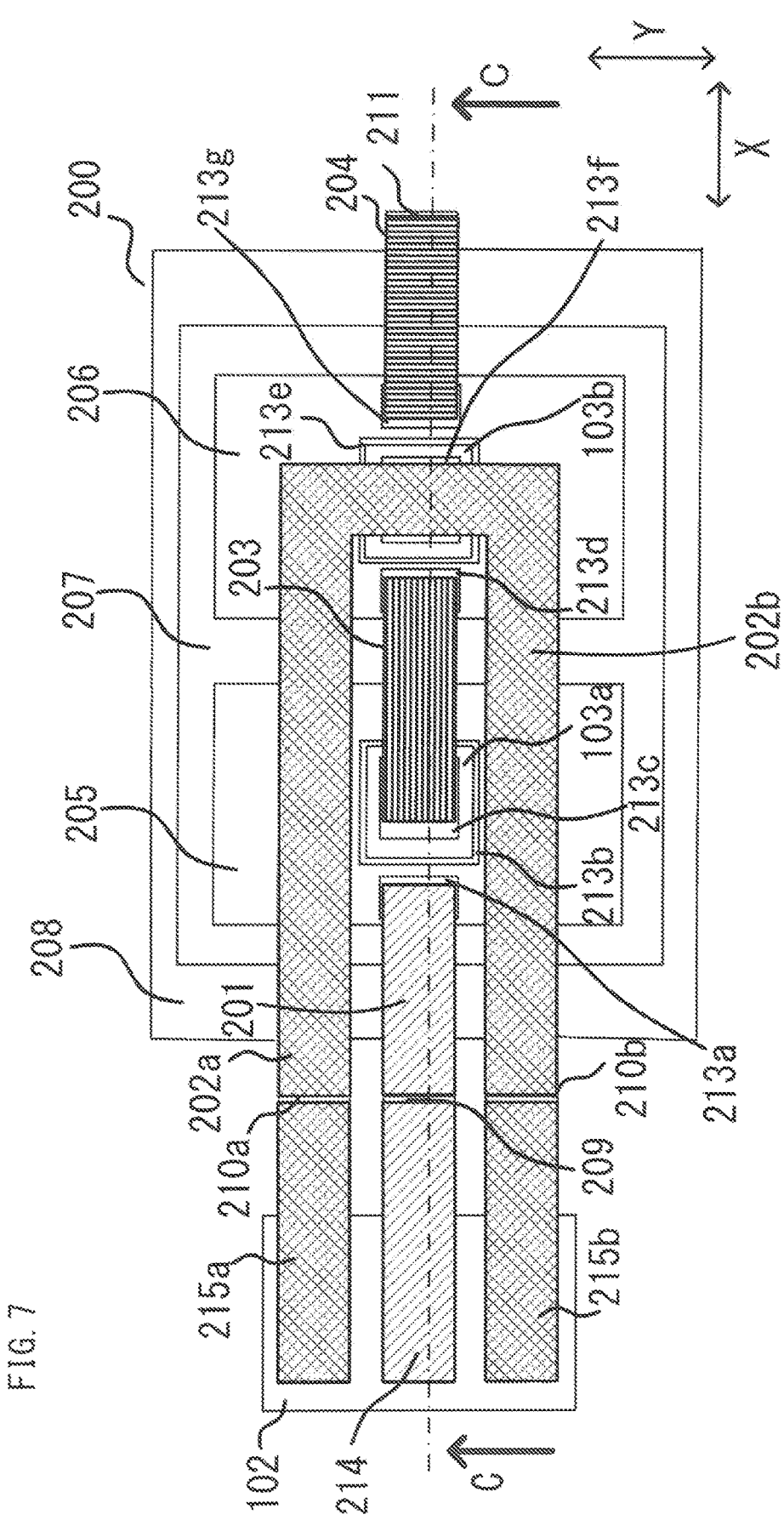
FIG. 7 is a cross-sectional plane view showing a state in which a smoothing capacitor is connected to components of the semiconductor module shown in FIG. 3.
Figure 8:
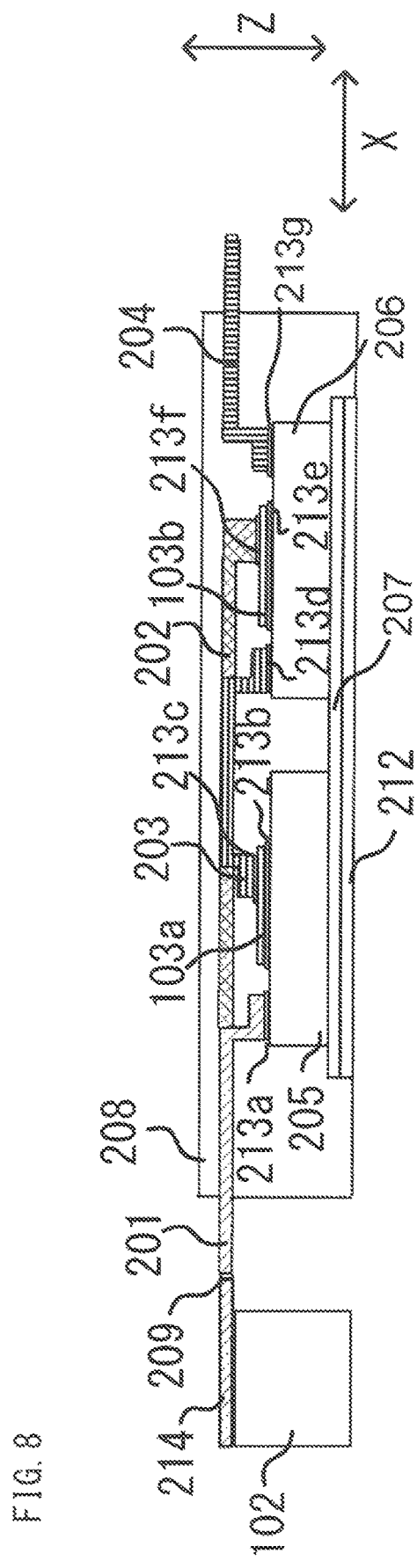
FIG. 8 is a cross-sectional view taken along a line C-C in FIG. 7.

FIG. 7 is a cross-sectional plane view showing a state in which the smoothing capacitor 102 is connected to components of the semiconductor module 200 shown in FIG. 3, and FIG. 8 is a cross-sectional view taken along a line C-C in FIG. 7. A positive-electrode-side busbar 214 of the smoothing capacitor 102 is connected at the positive-electrode-side connection terminal 209 to the P busbar 201 of the semiconductor module 200. Further, negative-electrode-side busbars 215*a* and 215*b* of the smoothing capacitor 102 are connected at the negative-electrode-side connection terminals 210a and 210b to the N busbars 202a and 202b of the semiconductor module 200. It is noted that connection between the busbars is performed by means of arc welding such as welding by tungsten inert gas (TIG). Here, a wire inductance caused by the positive-electrode-side busbar 214 of the smoothing capacitor 102 corresponds to the wire inductance 107 in FIG. 2, and a wire inductance caused by each of the negative-electrode-side busbars 215a and 215b of the smoothing capacitor 102 corresponds to the wire inductance 108 in FIG. 2.

If the smoothing capacitor 102 is disposed at a position adjacent to the positive-electrode-side connection terminal 209 and the negative-electrode-side connection terminals 210a and 210b disposed in the same direction as shown in FIG. 7, the positive-electrode-side busbar 214 and the negative-electrode-side busbars 215a and 215b of the smoothing capacitor 102 can be made so as to be short. Therefore, the wire inductances 107 and 108 caused by the positive-electrode-side busbar 214 and each of the negative-electrode-side busbars 215a and 215b can be reduced.

In the present embodiment, two P busbars are disposed such that an N busbar and an AC busbar are interposed therebetween, or two N busbars are disposed such that a P busbar and the AC busbar are interposed therebetween, in a semiconductor module having switching elements. Therefore it is possible to cancel out magnetic fluxes generated by busbars through which currents for phases opposite to each other flow. Consequently, not only a magnetic flux generated by each of the P busbar(s) and the N busbar(s) but also a magnetic flux generated by the AC busbar can be canceled out, and thus the wire inductance of the entire semiconductor module can be reduced. Further, two busbars are disposed such that busbars through which current flows in a direction opposite to the directions of currents flowing through the two busbars are interposed between the two busbars. Consequently, magnetic fluxes can be canceled out between the adjacent busbars. Thus, it is possible to provide a semiconductor module in which the magnetic flux cancellation effect is higher and wire inductances are lower than the case in which a semiconductor module is configured by a pair of busbars as shown in the power converter of Patent Document 1. Therefore, surge voltage based on a wire inductance can be reduced. Further switching loss in the switching elements and heat generated by the switching elements can be reduced. Whereby the number of accessory parts such as a heat dissipation member can be reduced. Further, the entire device can be downsized, and thus device downsizing and cost reduction can be realized.

Figure 9:
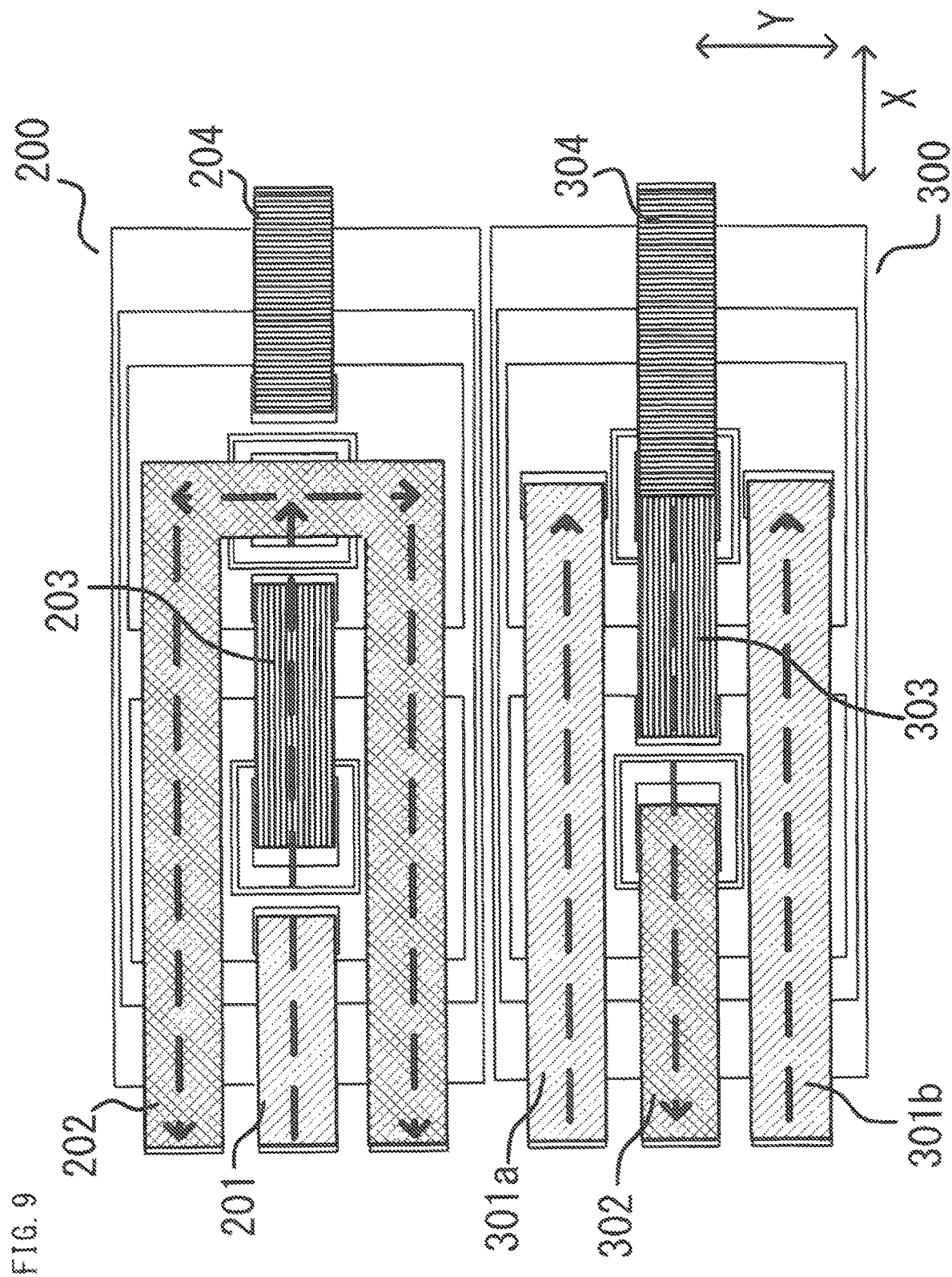
FIG. 9 is a cross-sectional plane view showing the semiconductor modules according to the first embodiment.

FIG. 9 is a cross-sectional plane view showing the semiconductor modules in another mode. In the case in which a plurality of semiconductor modules are used in parallel, the wire inductance caused by each busbar can be further reduced by arranging the semiconductor module (first semiconductor module) 200 and the semiconductor module (second semiconductor module) 300 adjacently to each other. FIG. 9 shows an arrangement example for realizing such a configuration. Current paths in the case in which surge voltage is generated are indicated by dotted line arrows in FIG. 9. If the semiconductor module 200 and the semiconductor module 300 are disposed adjacently to each other, currents flow in directions opposite to each other through respective adjacent ones of the busbars. Thus, magnetic fluxes generated by the respective busbars can be effectively canceled out. Therefore, the wire inductances 109, 110, and 111 caused by the P busbar 201, the N busbar 202, the AC busbar 203, the P busbars 301a and 301b, the N busbar 302, and the AC busbar 303 can be reduced. Although the case in which two semiconductor modules are disposed in parallel has been described with reference to FIG. 9, the same effect is obtained by alternately disposing the semiconductor modules (first semiconductor modules) 200 and the semiconductor modules (second semiconductor modules) 300 in accordance with the number of the semiconductor modules to be disposed in parallel.

Second Embodiment

Figure 10:
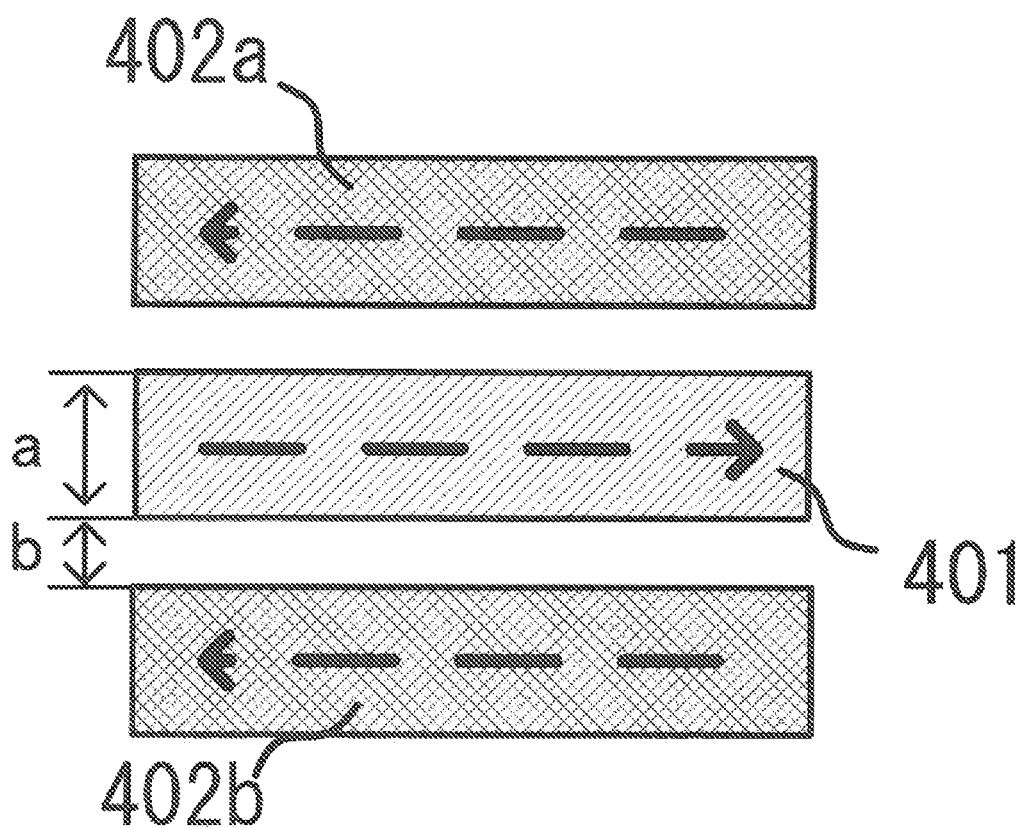
FIG. 10 is a simplified plane view showing the shapes of busbars in the semiconductor modules.
Figure 11:
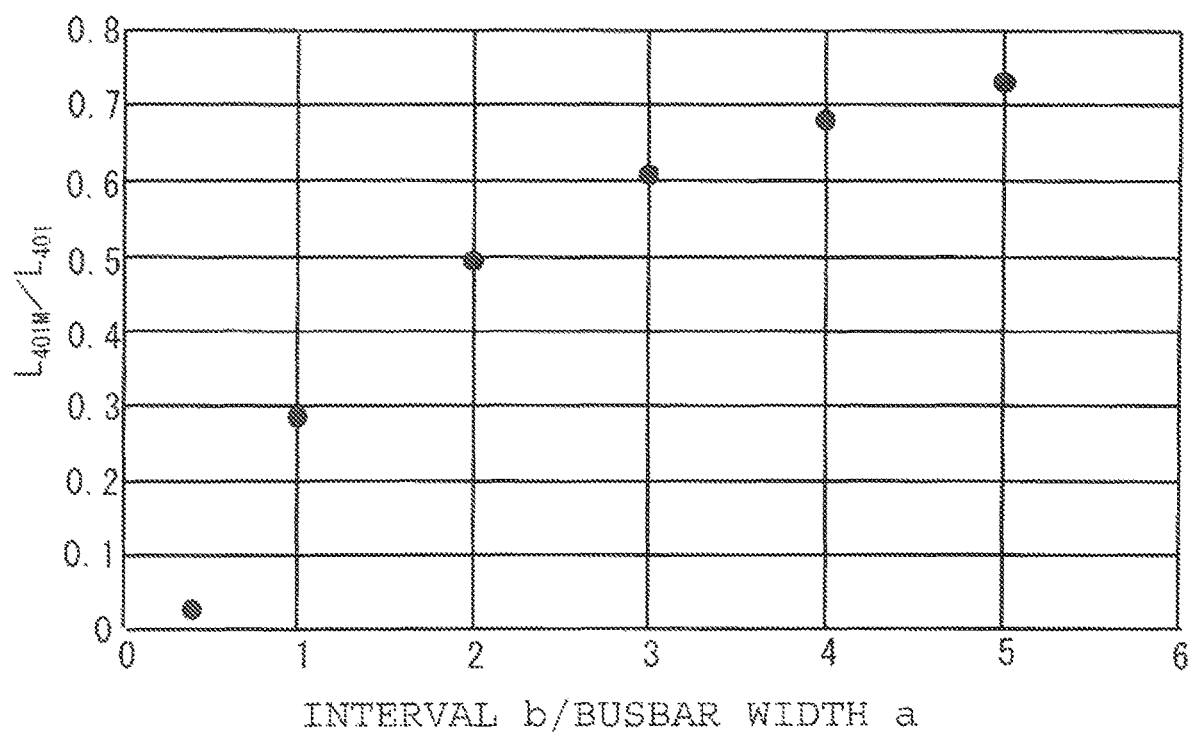
FIG. 11 is a graph indicating a result of performing, through analysis, calculation for a relationship of the ratio of a combined inductance to a self-inductance.

Next, the widths of busbars, the intervals between the busbars, and the rate of reduction in inductance will be described with reference to FIG. 10, FIG. 11, and FIG. 12. FIG. 10 is a simplified plane view showing the shapes of the busbars in either of the semiconductor module 200 and the semiconductor module 300. Busbars 402a and 402b are disposed such that a busbar 401 is interposed therebetween. The self-inductances in the busbars 401, 402a, and 402b are respectively defined as $L_{401}$, $L_{402a}$, and $L_{402b}$, and the coupling coefficient between $L_{401}$ and $L_{402a}$ is defined as $K_a$, and the coupling coefficient between $L_{401}$ and $L_{402b}$ is defined as $K_b$. Whereby a mutual inductance $M_a$ between $L_{401}$ and $L_{402a}$ and a mutual inductance $M_b$ between $L_{401}$ and $L_{402b}$ can be expressed by the following expressions (2).

$$M_a = K_a \times \sqrt{L_{401} \times L_{402a}} \quad \text{[Numeral 1]}$$

$$M_b = K_b \times \sqrt{L_{401} \times L_{402b}} \quad (2)$$

From expression (2), it is found that larger coupling coefficients $K_a$ and $K_b$ between the respective inductances lead to larger mutual inductances $M_a$ and $M_b$. If currents flow such that the direction thereof is opposite between the busbar 401 and each of the busbars 402a and 402b, magnetic fluxes generated by adjacent ones of the busbars are canceled out, and the combined inductance $L_{402M}$ of the busbar 401 can be expressed by the following expression (3).

$$L_{401M} = L_{401} - M_a - M_b \quad (3)$$

According to expression (3), lager mutual inductances $M_a$ and $M_b$ can lead to a smaller combined inductance $L_{401M}$ of the busbar 401. FIG. 11 shows a result of performing, through analysis, calculation for a relationship of the ratio of the combined inductance $L_{401M}$ to the self-inductance $L_{401}$. Where: the width of the busbars 401, 402a, and 402b is defined as "a" [mm]; each of the intervals between adjacent ones of the busbars is defined as "b" [mm]. And current is caused to flow such that the direction thereof is opposite between the busbar 401 and each of the busbars 402a and 402b, the width "a" [mm] of the busbar is fixed, and the interval "b" [mm] between the busbars is varied. Specifically, in FIG. 11, the horizontal axis indicates the ratio of the interval "b" [mm] between the busbars to the width "a" [mm] of the busbar, and the vertical axis indicates the ratio of the combined inductance $L_{401M}$ to the self-inductance $L_{401}$. According to expressions (2), expression (3), and this result, a smaller interval "b" [mm] between the busbars leads to larger coupling coefficients $K_a$ and $K_b$ between the inductances, and thus leads to a smaller combined inductance $L_{401M}$.

If the ratio of the interval "b" [mm] between the busbars to the width "a" [mm] of the busbar is set to be equal to or smaller than 1, the combined inductance $L_{401M}$ can be reduced so as to be equal to or smaller than 30% of the self-inductance $L_{401}$. That is, if the width "a" [mm] of the busbar is set to be equal to or larger than the interval "b" [mm] between the busbars, the inductance reduction effect can be sufficiently obtained.

Figure 12:
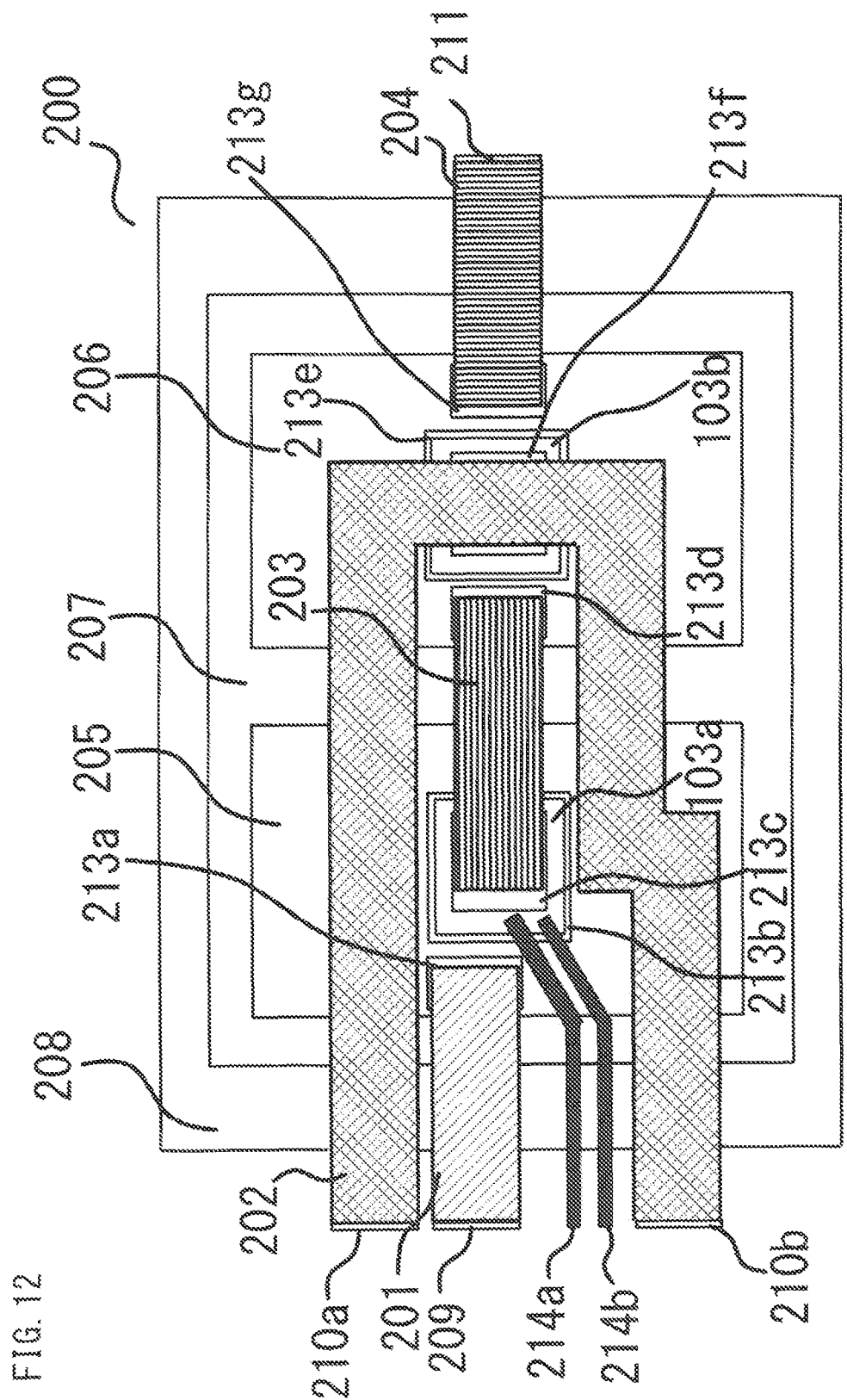
FIG. 12 is a cross-sectional plane view showing a semiconductor module according to a second embodiment.

In actuality, control terminals 214a and 214b which are a gate wire and a source wire are required in order to drive the switching elements 103a and 103b, as shown in FIG. 12. The control terminals 214a and 214b are not shown in FIG. 3 and the like. In the arrangement example shown in FIG. 12, the P busbar 201, the N busbar 202, and the AC busbar 203 are disposed such that, at locations excluding the location at which the control terminals 214a and 214b are disposed, the width "a" [mm] of the busbar is equal to or larger than the interval "b" [mm] between the busbars, whereby the inductances can be reduced. As Judged from above, if a width of any of the first busbar, the second busbar, and the third busbar is defined as "a" [mm], and each of intervals between the busbars is defined as "b" [mm], "a" and "b" are set so as to satisfy b≤a in at least one part of the first busbar, the second busbar, and the third busbar.

Figure 13:
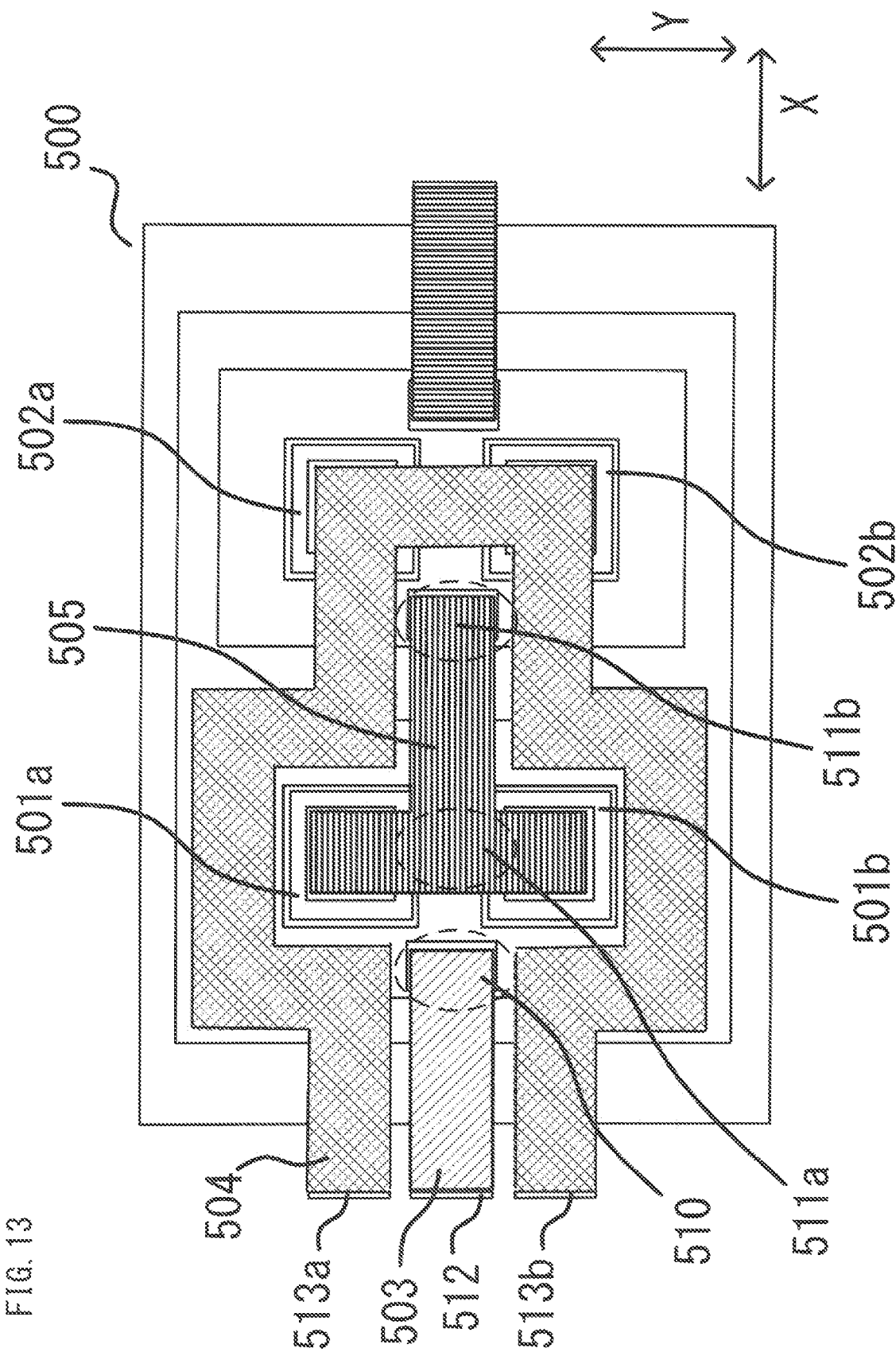
FIG. 13 is a cross-sectional plane view showing another semiconductor module according to the second embodiment.
Figure 14:
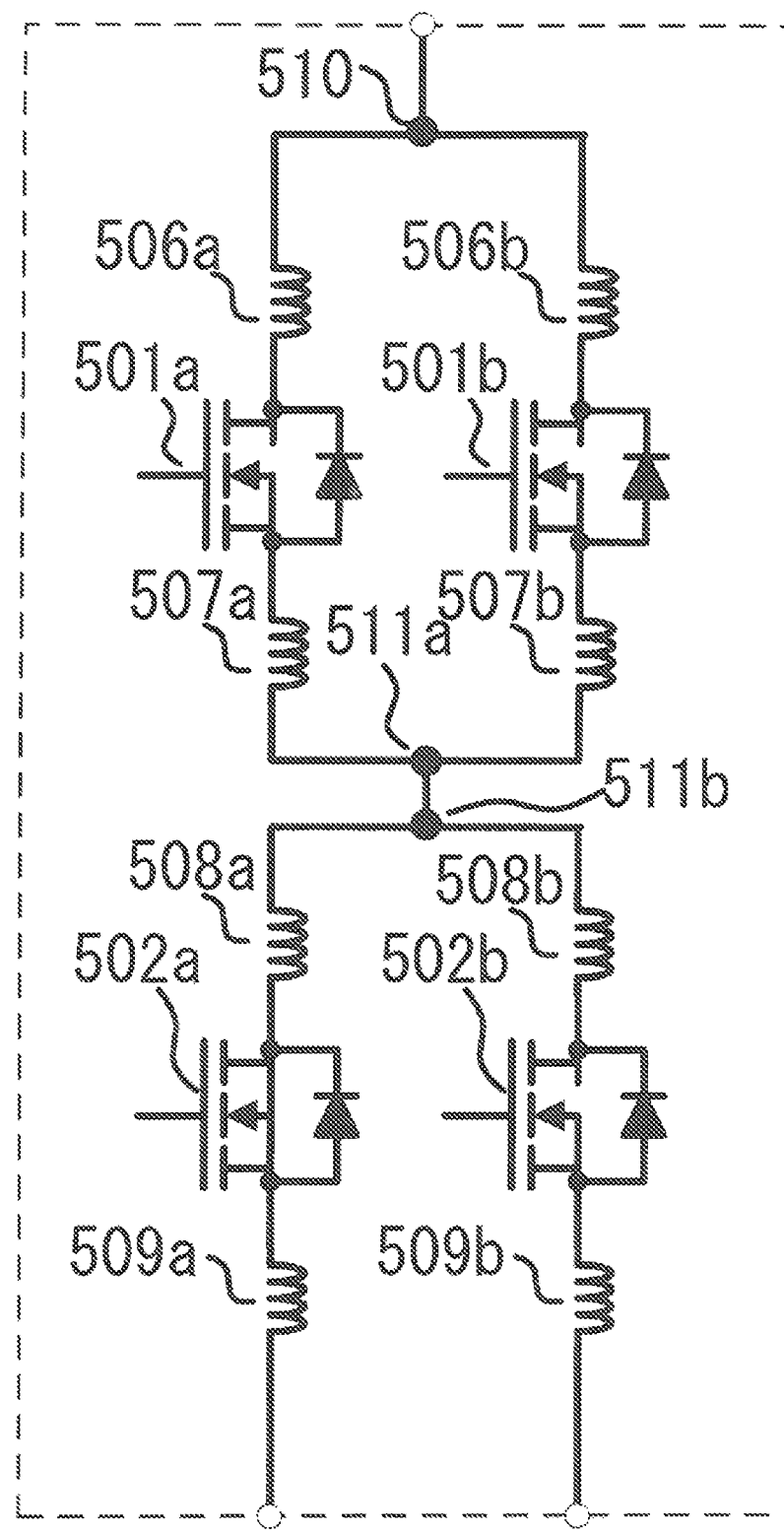
FIG. 14 is an equivalent circuit diagram of the semiconductor module according to the second embodiment.

FIG. 13 is a cross-sectional plane view showing another semiconductor module according to the second embodiment, and FIG. 14 is an equivalent circuit diagram thereof. FIG. 13 and FIG. 14 respectively show a configuration of a semiconductor module 500 in which switching elements of the semiconductor module 200 shown in FIG. 3 are disposed in parallel to each other. Switching elements 501a and 501b form an upper arm, and switching elements 502a and 502b form a lower arm. An N busbar 504 is disposed such that a P busbar 503 and an AC busbar 505 are sandwiched by the N busbar 504, in the same manner as in the semiconductor module 200 shown in FIG. 3. More specific descriptions are as follows. In the semiconductor module 500, the P busbar 503 and the AC busbar 505 are disposed between two parts branched off from the N busbar 504, in the direction (X direction) in which a terminal 512 of the P busbar 503, and terminals 513a, 513b of the N busbar 504 protrude.

In FIG. 14, a wire inductance on a drain side of the switching element sola is denoted by 506a, a wire inductance on a drain side of the switching element 501b is denoted by 506b, a wire inductance on a source side of the switching element sola is denoted by 507a, a wire inductance on a source side of the switching element 501b is denoted by 507b, a wire inductance on a drain side of the switching element 502a is denoted by 508a, a wire inductance on a drain side of the switching element 502b is denoted by 508b, a wire inductance on a source side of the switching element 502a is denoted by 509a, and a wire inductance on a source side of the switching element 502b is denoted by 509b.

Here, if, at the time of using the plurality of switching elements in parallel, there are differences between the respective wire inductances, unevenness in current division between the switching elements increases. Consequently, more heat is generated from a switching element through which more current flows. Considering this, it is preferable that the wire inductances 506a and 506b, the wire inductances 507a and 507b, the wire inductances 508a and 508b, and the wire inductances 509a and 509b are equal to each other. As shown in FIG. 13, a branch point 510 of the P busbar 503 and branch points 511a and 511b of the AC busbar 505 are located at equal distances from the switching elements disposed in parallel. Further, the N busbar 504 is disposed so as to be symmetric with respect to a center line of the module. By configuring the module as described above, wires can be disposed so as to be symmetric with respect to the center line of the module, and the lengths of the wires can be set to be equal to each other on both sides of the center line of the module. Therefore, the wire inductances 506a and 506b, the wire inductances 507a and 507b, the wire inductances 508a and 508b, and the wire inductances 509a and 509b can be set to be equal to each other.

Although each switching element has been described as an MOSFET in the above embodiments, the switching element may be formed by using a wide-bandgap semiconductor made from SiC, GaN, or the like. The wide-bandgap semiconductor can be driven at high frequency, has a high switching speed (dv/dt, di/dt), and enables reduction in loss. A higher switching speed (di/dt) leads to a larger surge voltage. Thus, if the present embodiment is configured by using the wide-bandgap semiconductor, surge voltage and heat generated by each switching element can be reduced. Consequently, downsizing of the power converter and increase in the efficiency of the power converter can be further realized.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A semiconductor module comprising:
   a switching circuit composed of a first semiconductor element and a second semiconductor element connected in series;
   a first busbar connected to a positive electrode side of the first semiconductor element;
   a second busbar connected to a negative electrode side of the second semiconductor element; and
   a third busbar connected to a negative electrode side of the first semiconductor element and a positive electrode side of the second semiconductor element, wherein
   the first busbar, the second busbar, and the third busbar extend in a same direction, and
   one busbar out of the first busbar and the second busbar is disposed such that the third busbar and another busbar out of the first busbar and the second busbar are interposed within the one busbar.

2. The semiconductor module according to claim 1, wherein
   the second busbar is disposed so as to branch into two parts, and
   the first busbar and the third busbar are disposed between the two parts branched off from the second busbar.

3. The semiconductor module according to claim 1, wherein
   the first busbar is composed of two busbars, and
   the second busbar and the third busbar are disposed between the two busbars of the first busbar.

4. The semiconductor module according to claim 1, the semiconductor module forming
   a first semiconductor module in which
   the second busbar is disposed so as to branch into two parts, and the first busbar and the third busbar are disposed between the two parts branched off from the second busbar, and a second semiconductor module in which the first busbar is composed of two busbars, and the second busbar and the third busbar are disposed between the two busbars of the first busbar, the first semiconductor modules and the second semiconductor modules being alternately disposed.

5. The semiconductor module according to claim 1, wherein the first busbar, the second busbar, and the third busbar are disposed such that at least one part is substantially flush with one another.

6. The semiconductor module according to claim 1, wherein the first semiconductor element and the second semiconductor element are packaged in the same module.

7. The semiconductor module according to claim 1, wherein if a width of any of the first busbar, the second busbar, and the third busbar is defined as "a", and each of intervals between the busbars is defined as "b", "a" and "b" are set so as to satisfy b≤a in at least one part of the first busbar, the second busbar, and the third busbar.

8. The semiconductor module according to claim 1, wherein each of the first semiconductor element and the second semiconductor element is a wide-bandgap semiconductor.

9. A power converter in which the semiconductor module according to claim 1, the power converter comprising a smoothing capacitor configured so as to smooth DC voltage to be applied to the semiconductor module, wherein the first busbar has a first terminal portion configured so as to be connected to a positive-electrode-side wire of the smoothing capacitor, the second busbar has a second terminal portion configured so as to be connected to a negative-electrode-side wire of the smoothing capacitor, and the first terminal portion and the second terminal portion protrude in a same direction.

10. The semiconductor module according to claim 2, wherein the first busbar, the second busbar, and the third busbar are disposed such that at least one part is substantially flush with one another.

11. The semiconductor module according to claim 3, wherein the first busbar, the second busbar, and the third busbar are disposed such that at least one part is substantially flush with one another.

12. The semiconductor module according to claim 4, wherein the first busbar, the second busbar, and the third busbar are disposed such that at least one part is substantially flush with one another.

13. The semiconductor module according to claim 2, wherein the first semiconductor element and the second semiconductor element are packaged in the same module.

14. The semiconductor module according to claim 3, wherein the first semiconductor element and the second semiconductor element are packaged in the same module.

15. The semiconductor module according to claim 4, wherein the first semiconductor element and the second semiconductor element are packaged in the same module.

16. The semiconductor module according to claim 5, wherein the first semiconductor element and the second semiconductor element are packaged in the same module.

17. The semiconductor module according to claim 2, wherein if a width of any of the first busbar, the second busbar, and the third busbar is defined as "a", and each of intervals between the busbars is defined as "b", "a" and "b" are set so as to satisfy b≤a in at least one part of the first busbar, the second busbar, and the third busbar.

18. The semiconductor module according to claim 3, wherein if a width of any of the first busbar, the second busbar, and the third busbar is defined as "a", and each of intervals between the busbars is defined as "b", "a" and "b" are set so as to satisfy b≤a in at least one part of the first busbar, the second busbar, and the third busbar.

19. The semiconductor module according to claim 4, wherein if a width of any of the first busbar, the second busbar, and the third busbar is defined as "a", and each of intervals between the busbars is defined as "b", "a" and "b" are set sc as to satisfy b a in at least one part of the first busbar, the second busbar, and the third busbar.

20. The semiconductor module according to claim 5, wherein if a width of any of the first busbar, the second busbar, and the third busbar is defined as "a", and each of intervals between the busbars is defined as "b", "a" and "b" are set so as to satisfy b≤a in at least one part of the first busbar, the second busbar, and the third busbar.

* * * * *